(12) United States Patent
Nakamichi

(10) Patent No.: US 6,577,578 B1
(45) Date of Patent: Jun. 10, 2003

(54) DISK TRANSFER DEVICE WITH ALIGNMENT MECHANISM

(75) Inventor: Niro Nakamichi, Tokyo (JP)

(73) Assignee: Nakamichi Corporation, Kodaira (JP)

( * ) Notice: Subject to any disclaimer, the term of this patent is extended or adjusted under 35 U.S.C. 154(b) by 0 days.

(21) Appl. No.: 09/057,209

(22) Filed: Apr. 8, 1998

(30) Foreign Application Priority Data

Apr. 8, 1997 (JP) ............................................. 9-105135

(51) Int. Cl.[7] .............................................. G11B 33/02
(52) U.S. Cl. ................................................... 369/77.1
(58) Field of Search ............................. 369/75.1, 75.2, 369/77.2, 77.1

(56) References Cited

U.S. PATENT DOCUMENTS

| | | | | |
|---|---|---|---|---|
| 4,498,162 A | * | 2/1985 | Schatteman | 369/77.1 |
| 4,677,607 A | * | 6/1987 | Ejiri | 369/77.1 |
| 4,682,320 A | * | 7/1987 | D'Arc | 369/77.1 |
| 4,969,140 A | * | 11/1990 | Koiwa et al. | 369/77.1 |
| 4,979,160 A | | 12/1990 | Araki | 369/75.2 |
| 5,166,917 A | * | 11/1992 | Decoster et al. | 369/77.1 |
| 5,416,763 A | * | 5/1995 | Ohsaki | 369/77.1 |
| 5,493,551 A | * | 2/1996 | Kido | 369/77.1 |
| 5,544,148 A | * | 8/1996 | Nakamichi | 369/192 |
| 5,561,658 A | | 10/1996 | Nakamichi et al. | 369/263 |
| 5,737,293 A | * | 4/1998 | Kawamura et al. | 369/77.1 |

FOREIGN PATENT DOCUMENTS

| | | |
|---|---|---|
| JP | 2-6534 | 2/1990 |
| JP | 2-10614 | 3/1990 |
| JP | 4-72306 | 11/1992 |

* cited by examiner

Primary Examiner—David L. Ometz
Assistant Examiner—Tod Kupstas
(74) Attorney, Agent, or Firm—Darby & Darby

(57) ABSTRACT

In a disk playback device, a driven disk guide and a fixed disk guide provide transverse movement for a disk. A pivoting arm with an engagement cavity, engages with an edge of an inserted disk and guides the disk during movement into the apparatus. A spring biases the pivoting arm toward a front of the device so that the pivoting arm is in a correct position when the disk is first inserted. As a disk is inserted into the device, the pivoting arm rotates away from a center of the disk. When the full diameter of the disk enters the apparatus, the pivoting arm rotates completely, moves into a slit disposed in the fixed disk guide, and is thereby recessed from the edge of the disk.

21 Claims, 15 Drawing Sheets

DISK TRANSFER DEVICE WITH ALIGNMENT MECHANISM

BACKGROUND OF THE INVENTION

The present invention relates to a disk transferring device which transfers a disk while supporting the disk at two points. A disk which is inserted into a slot on a device front panel is directly loaded to the playback position inside the device. This slot-in method of the loading mechanism is mainly used in car-mounted compact disk players. As disclosed in Japanese Examined patent number 4-62146, this slot-in method of loading is generally performed by having the upper surface and lower surface of a disk sandwiched between two loading rollers having smaller diameters than the inserted disk. The rollers rotate towards the center of the disk, thereby transferring the disk inside the device. In Japanese Laid-Open Patent number 8-241552, the left edge and the right edge of a disk is sandwiched between two guide pieces which extend in the direction of transfer.

Since the loading mechanisms transfer the disk by supporting it at a first and a second point, pitching or vertical vibrations in the forward and rear portions of the disk are easily generated with the supported points acting as the pivot. This becomes a cause for clamp miss. These disk transferring mechanisms only have a weak correction force which keeps disks level when disks are inserted with the front sloping down or the front sloping up. Disks can contact mechanisms inside the device such as a clamper, thereby damaging the disk.

These problems are also addressed in Japanese Examined Patent publication number 4-72306 (shown in FIG. 14). In this publication, a shaft center 1A of a loading roller 1 is placed further towards the device front panel than a shaft center 2A of a loading roller 2. A vertical plane Y1 passing through shaft center 1A is displaced by a distance d from a vertical plane Y2 passing through shaft center 2A. A disk D is forced into a position where the front portion is sloped upwards. The transfer position is maintained by stoppers 7, 8 as shown in FIG. 14. When disk D is to be played, clamper 4 on clamper arm 3 is rotated counter-clockwise. This rotation causes disk D to be clamped onto a turntable 6 which is disposed on a spindle axis 5A of a spindle motor 5.

Nevertheless, this proposal is difficult to apply to disk transferring mechanisms which transfer disks by having the disk outer edge sandwiched by two guide pieces which extend in the direction of transfer. There are also problems due to damage to the disk recording surface by the contact with stoppers 7, 8 during the transfer step. These can result in reading errors and playback interruptions.

OBJECTS AND SUMMARY OF THE INVENTION

It is an object of the present invention to overcome the drawbacks of the prior art.

It is a further object of the present invention to provide a disk playback device with a support for maintaining an alignment of an inserted disk.

In a disk transferring device a disk is supported at a first point and a second point and transferred. A supporting member includes an engagement cavity which is capable of engaging with the edge of the disk at a point differing from the supported points. The supporting member moves in conjunction with the transfer of the disk thereby maintaining the position of the disk during a transfer step.

By the device of the present invention as described above, the supporting member maintains the disk at a constant position during the transferring step by having an engagement cavity engaged with the disk edge.

Briefly stated, in a disk playback device, a driven disk guide and a fixed disk guide provide transverse movement for a disk. A pivoting arm with an engagement cavity, engages with an edge of an inserted disk and guides the disk during movement into the apparatus. A spring biases the pivoting arm toward a front of the device so that the pivoting arm is in a correct position when the disk is first inserted. As a disk within the device, the pivoting arm rotates away from a center of the disk. When the full diameter of the disk enters the apparatus, the pivoting arm rotates completely, moves into a slit disposed in the fixed disk guide, and is thereby recessed from the edge of the disk.

According to an embodiment of the present invention, a disk transfer device with a means for maintaining alignment of an inserted disk comprises at least a first and second guide member for guiding said disk. A support member is used for engaging with an edge of said disk. The support member keeps contact with said edge during a first movement of said disk within said disk transfer device thereby maintaining said alignment of said disk.

According to another embodiment of the present invention, a disk transfer device with a means for maintaining alignment of an inserted disk comprises at least a driven disk guide and a fixed disk guide for guiding said disk. The driven disk guide has a means for moving said disk along said fixed disk guide. A support member is used for engaging with an edge of said disk. The support member keeps contact with said edge during a first movement of said disk within said disk transfer device thereby maintaining said alignment of said disk. At least one of said driven and fixed disk guide members includes a slit for receiving said support member thereby allowing said support member to assume a recessed position with respect to said edge. A spring is connected to said support member. The spring biases said support member toward a front of said disk transfer device. A stopper is disposed on said front of said disk transfer device. The stopper limits a second movement of said support member.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
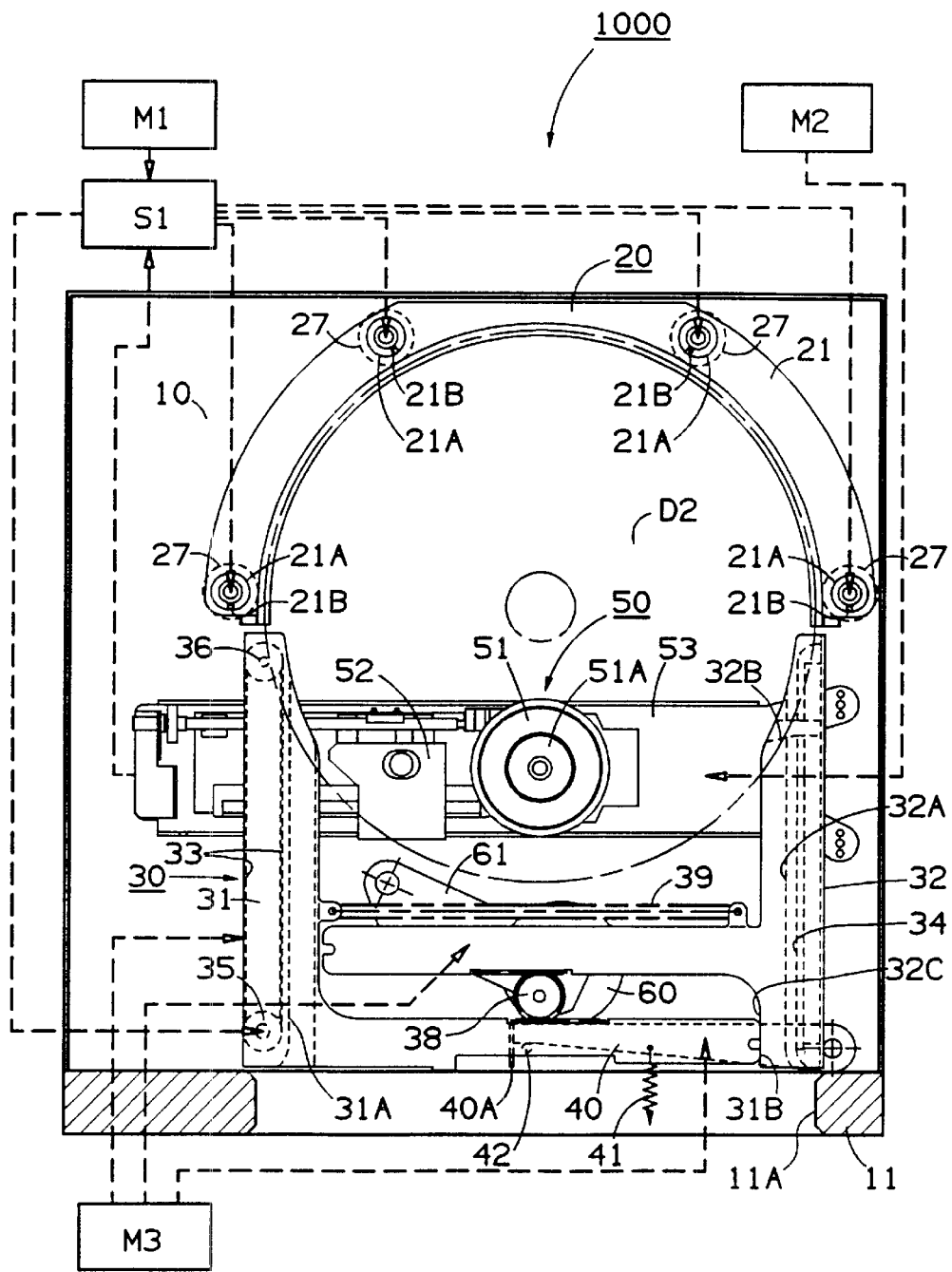
FIG. 1 is a schematic top-view drawing of a changer-type disk playback device 1000 in which the disk transfer mechanism of the present invention is implemented.

Referring to FIGS. 1–8, there is shown a schematic top-view drawing of a changer-type disk playback device 1000 which implements the alignment mechanism of the present invention. Disk playback device 1000 is a changer-type disk playback device capable of selectively playing back a plurality of disks. Disk playback device 1000 has a stocker 20, which holds a plurality of disks toward the rear of the device. A disk inserted from a slot 11A of a front panel 11 passes through a playback position and is stored in stocker 20.

Stocker 20 has six independent disk holders 21–26 (FIGS. 10–12) for holding six disks D1–D6 respectively. Spaces are formed between a disk at the playback position and disks above and below it at storage positions. An optical mechanism 50 and a clamper 60 are inserted into those spaces. Disk holders 21–26 are attached to four stocker screws 27 to allow vertical movement relative to chassis 10. The four stocker screws 27 are rotatably attached to chassis 10 and are connected to a drive mechanism M1 via a switching mechanism S1, which rotates the screws simultaneously. Switching mechanism S1 performs switching based on the position of optical mechanism 50, which is described later. When optical mechanism 50 is at a front position (FIG. 8), the drive force from drive mechanism M1 is transferred to stocker screw 27. When optical mechanism 50 is at a rear position (FIG. 1), the drive force from drive mechanism M1 is transferred to a pulley 35 of a driven disk guide 31, which is described later.

Figure 9:
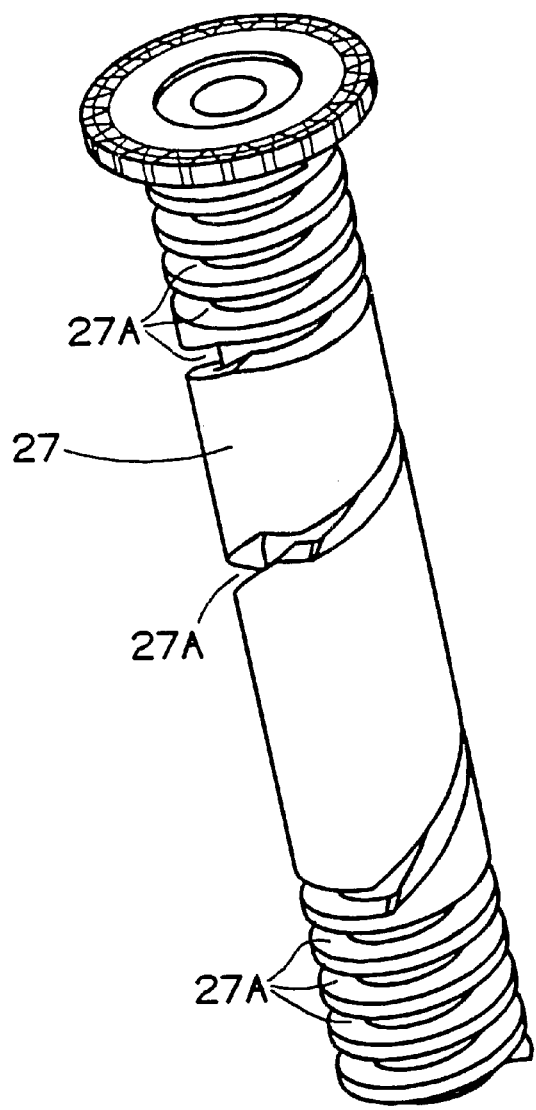
FIG. 9 is a perspective drawing of stocker screw 27.

Referring also to FIG. 9, a spiral guide 27A having an irregular pitch is formed on the circumferential edge of stocker screws 27. Disk holders 21–26 are guided up and down in the device via stocker screws 27. Guide holes 21A–26A are disposed in disk holders 21–26 in axial alignment with one another. Guide pins 21B–26B project into guide holes 21A–26A (in FIG. 9 guide holes 22A–26A are hidden). Guide pins 21B–26B are guided by spiral guide 27A. Thus, disk holders 21–26 are moved vertically according to the rotation of stocker screws 27 through engagement of guide pins 21B–26B with spiral guide 27A.

Figure 10:
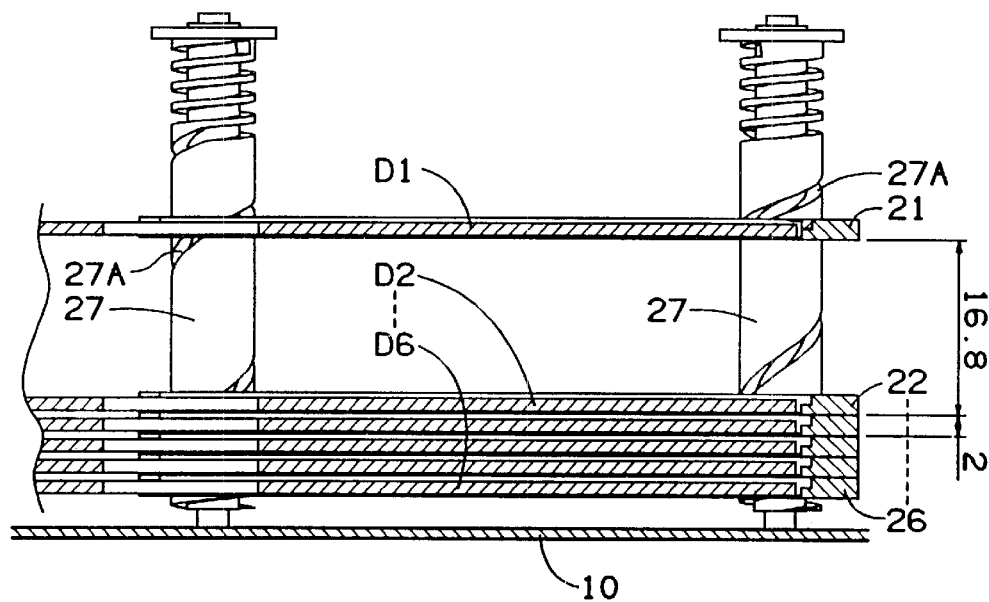
FIG. 10 is a cross-section drawing showing the positioning of spiral guide 27a and disk holders 21–26.
Figure 11:
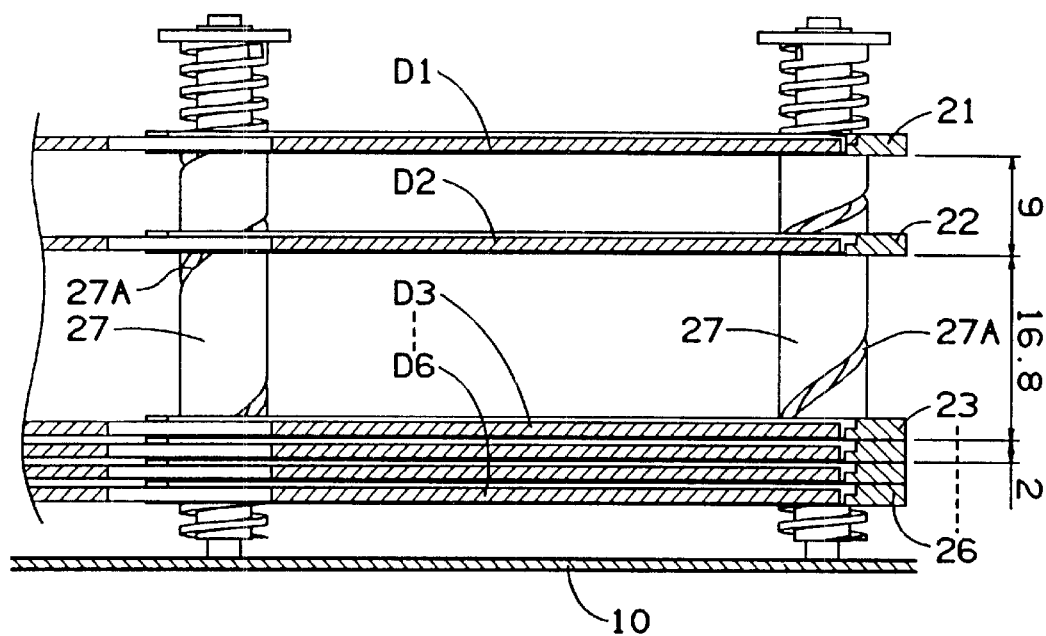
FIG. 11 is a cross-section drawing showing the positioning of spiral guide 27a and disk holders 21–26.
Figure 12:
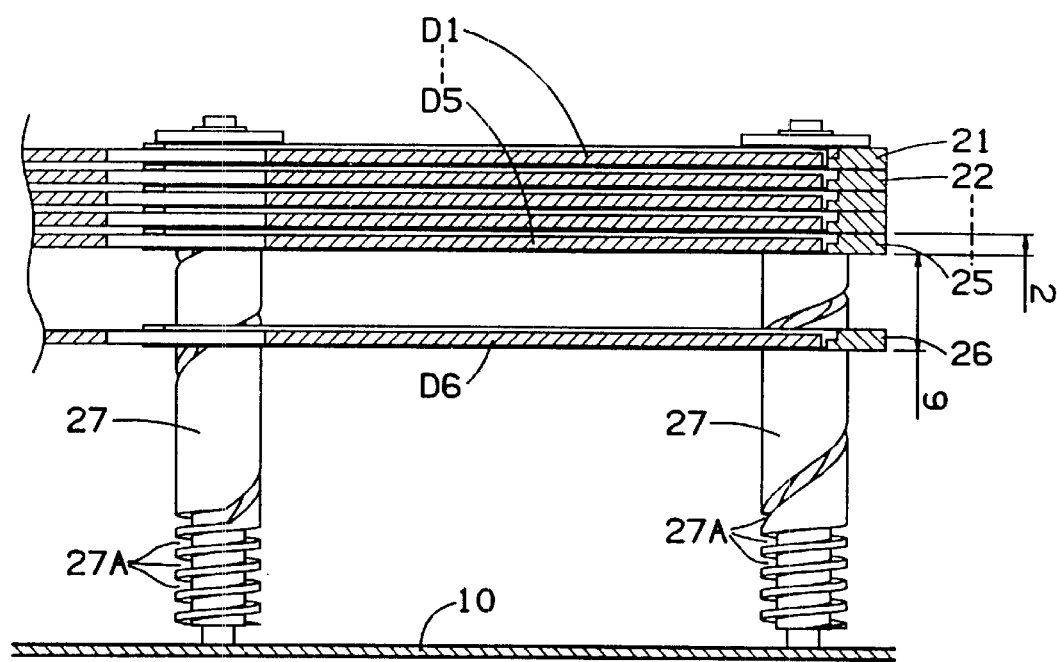
FIG. 12 is a cross-section drawing showing the positioning of spiral guide 27a and disk holders 21–26.

Referring to FIG. 10–FIG. 12, there are shown the relative positioning of stocker screws 27 and disk holders 21–26. When first disk holder 21 is brought to a disk transfer height (FIG. 10), second disk holder 22 is positioned 16.8 mm below first disk holder 21. Third disk holder 23 through sixth disk holder 26 are positioned at equal intervals, and each disk is positioned 2 mm below the disk above it (disk holders 22–25). From this state, if stocker screw 27 makes one clockwise (as seen from above the device) rotation, first disk holder 21 moves up 9 mm and second disk holder 22 moves up 16.8 mm so that it is aligned with the disk transfer height. At the same time, disk holder 23 through sixth disk holder 26 all move up 2 mm (FIG. 11). Thereafter, each time stocker screw 27 makes a full rotation, the next lowest disk holder is aligned with the disk transfer height. When sixth disk holder 26 is positioned at the disk transfer height, fifth disk holder 25 is positioned 9 mm above sixth disk holder 26, and first disk holder 21 through fourth disk holder 24 are positioned at equal intervals, each disk being positioned 2 mm above the disk below it (disk holders 22–25) (FIG. 12).

Figure 2:
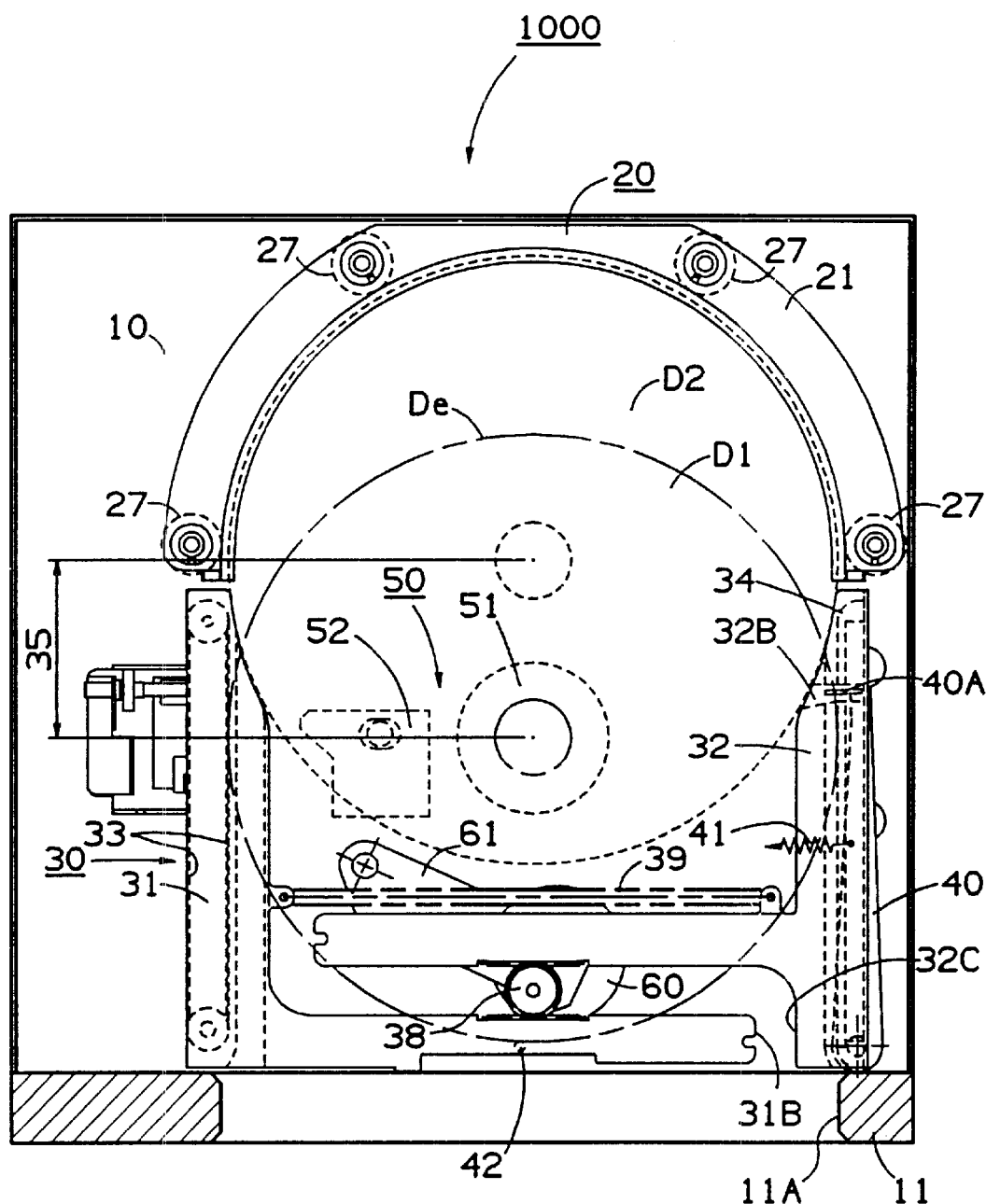
FIG. 2 is a top-view drawing for the purpose of describing the operations of disk playback device 1000.
Figure 6:
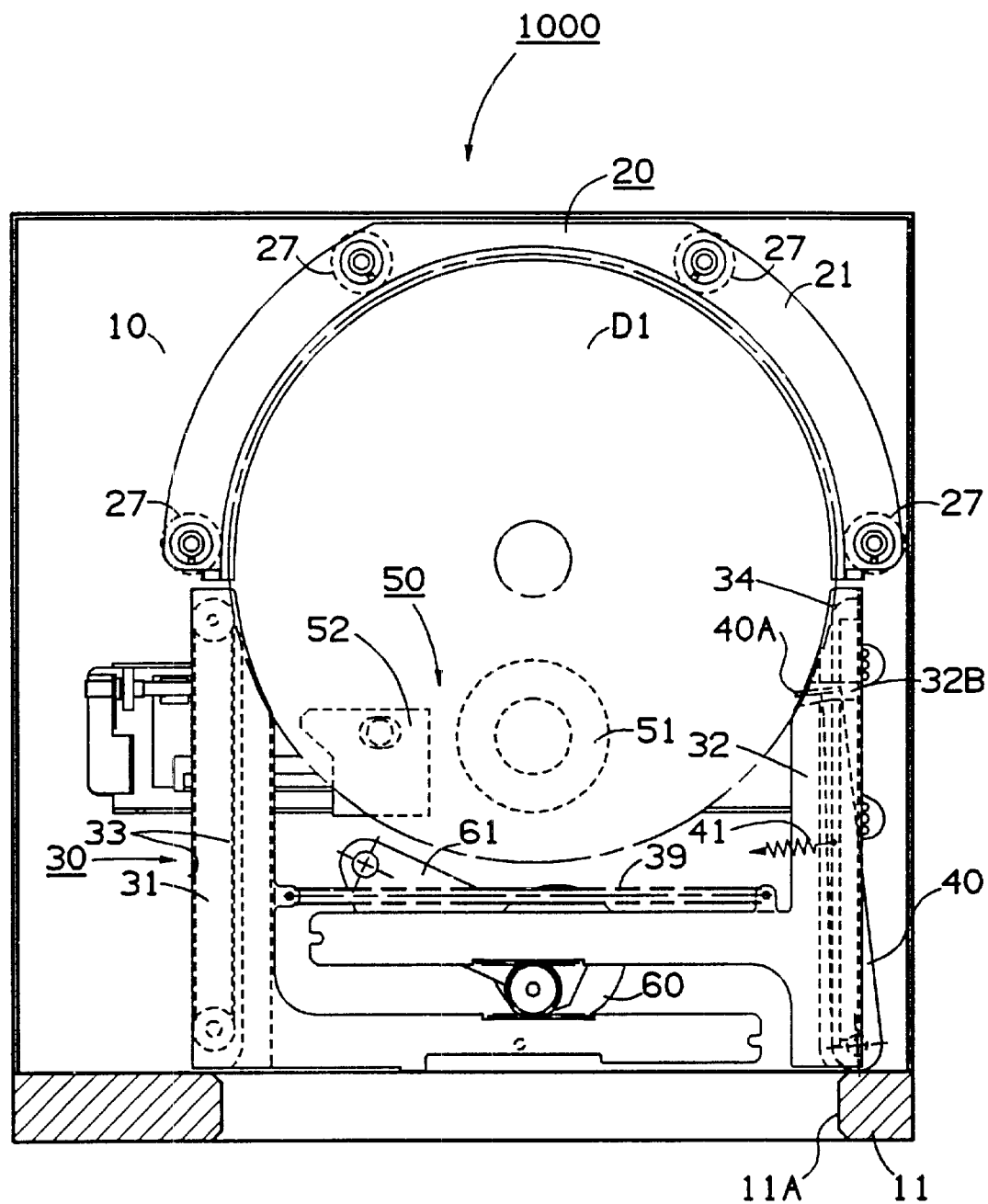
FIG. 6 is a top-view drawing for the purpose of describing the operations of disk playback device 1000.

Referring to FIGS. 1, 2, and 6, a disk inserted through slot 11a is supported from the left and right sides by a disk transfer mechanism 30. The disk passes through a playback position (FIG. 2) and is transferred to a holding position (FIG. 6), where it is held in disk holder 21, which is aligned with the disk transfer height. The height of slot 11A is set so that the slot is larger toward the center and more narrow toward the left and right ends. This allows slot 11A to engage only with the edge of the disk. According to the device of this embodiment, the playback position is positioned toward the front of the device 35 mm from the storing position. The center of rotation of a disk D1 at the playback position-overlaps with the disk surface of a disk D2 at the storing position (see FIG. 2).

Figure 13:
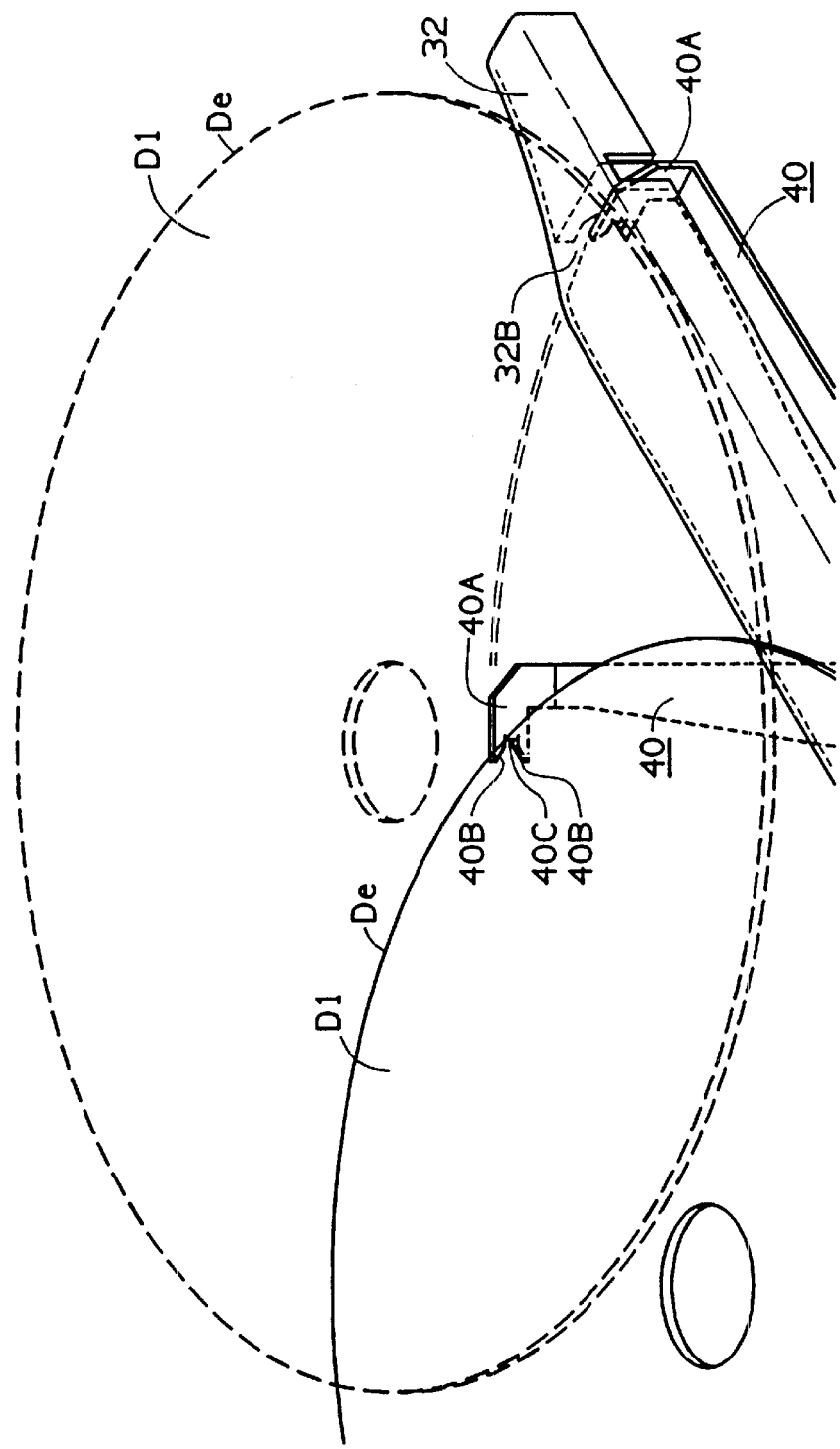
FIG. 13 is a schematic perspective drawing for the purpose of describing the operations of pivoting arm 40.
Figure 14:
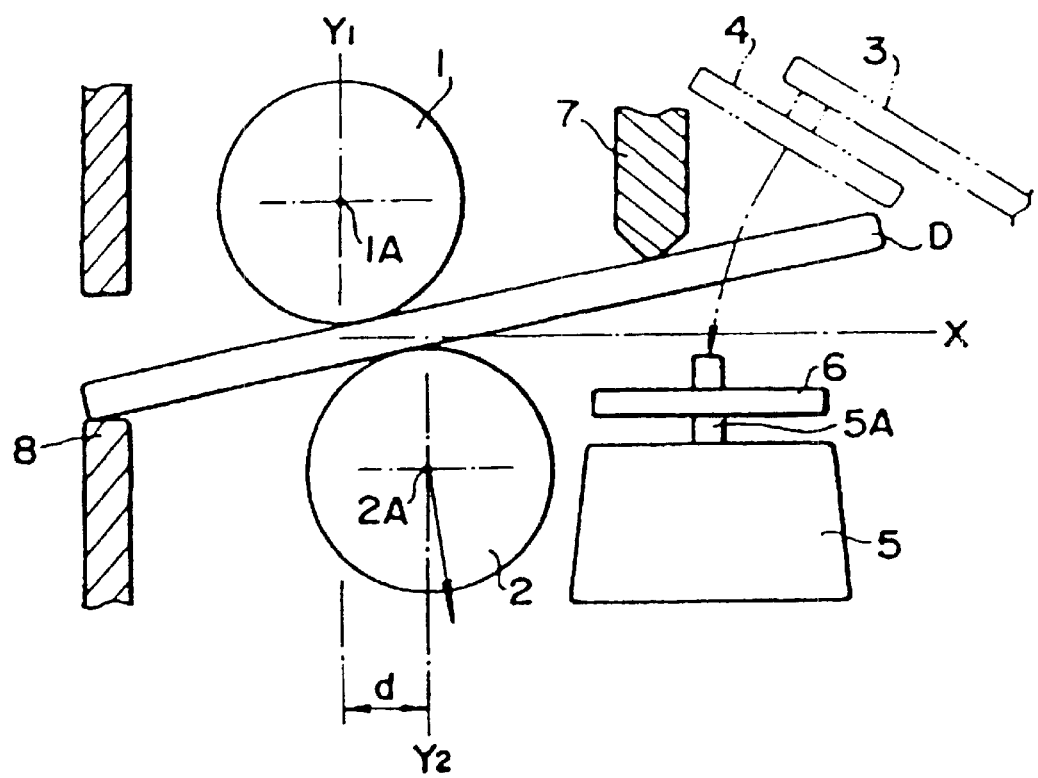
FIG. 14 is a side view of a disk transfer mechanism of the prior art.

Disk transfer mechanism 30 has a driven disk guide 31 disposed toward the left of the device and a fixed disk guide 32 disposed to the right of the device. Driven disk guide 31 has a guide groove 31A for guiding the left edge of a disk. Inside guide groove 31A, there is disposed a belt 33 for driving the outer left edge of the disk. Belt 33 is disposed across pulleys 35, 36 which are positioned at the front and the rear of driven disk guide 31. Pulley 35 is connected via switching mechanism S1 to drive mechanism M1, which rotates pulley 35. Fixed disk guide 32 has a guide groove 32A for guiding the right edge of a disk. Inside guide groove 32A, there is disposed a friction sheet 34, which engages with the outer right edge of the disk and prevents the disk from slipping. Referring momentarily to FIG. 13, a slit 32B is formed on fixed disk guide 32 to prevent engagement with a pivoting arm 40, which will be described later. Slit 32B is opened downward and is formed along the transfer path of an engagement cavity 40A of pivoting arm 40. Friction sheet 34 is discontinuous at slit 32B.

A guide groove formed on chassis 10 (not shown in the drawings) serves to guide driven and fixed disk guides 31, 32, allowing them to move to the left and right of the device. A rotatably supported pinion gear 38 connects driven and fixed disk guides 31, 32 so that they move in tandem. Driven and fixed disk guides 31, 32 are supported by a spring 39 and are positioned to an initial position, where slide surfaces 31B, 32C are in contact with one another. At the initial position, belt 33 and friction sheet 34 are separated by a distance that is smaller than the diameter of an inserted disk.

With disk transfer mechanism 30 described above, a disk is transferred while the outer left edge and the outer right edge of the disk are supported by driven and fixed disk guides 31, 32. Thus, during the transfer operation, pitching vibration can occur (with the points supporting the disk acting as the pivot). Guide grooves 31A, 32A must be formed shallow so that the recorded area of the disk is not damaged. Thus, the correction force allotted to keep the disk level is weak. Also, if the disk is inserted with the front of the disk sloping up or down, the inserted end of the disk can come into contact with mechanisms inside the device, such as the clamper, resulting in damage.

Referring to FIG. 13, in order to overcome this problem, disk transfer mechanism 30 includes a support member to provide support to the disk in order to keep the disk level during the transfer operation. According to this embodiment, the support member is a pivoting arm 40. Engagement cavity 40A is disposed at the end of pivoting arm 40 to engage with a disk edge De. Pivoting arm 40 is rotatably attached to the front and to the right of the device so that it passes through slit 32B of fixed disk guide 32. Thus, pivoting arm 40 is set to the minimum required length without obstructing disk transfer. Engagement cavity 40A has a sloped surface 40B, which guides the disk inserted from slot 11A, and a C-shaped groove 40C, into.which disk edge De is inserted. As with guide grooves 31A, 32A of driven and fixed disk guides 31, 32, C-shaped groove 40C is formed with a depth that prevents it from engaging with the disk recording area.

Figure 3:
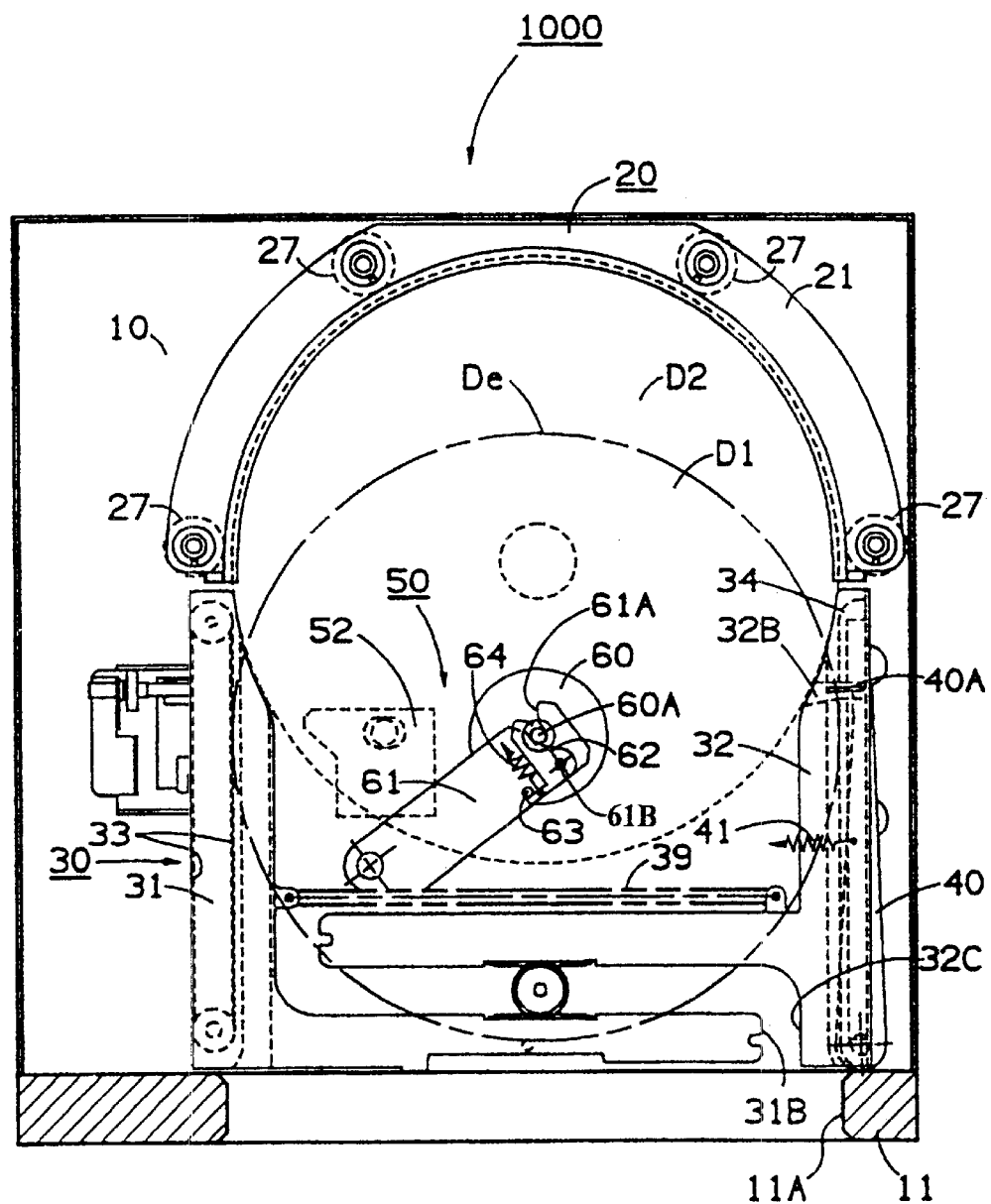
FIG. 3 is a top-view drawing for the purpose of describing the operations of disk playback device 1000.
Figure 4:
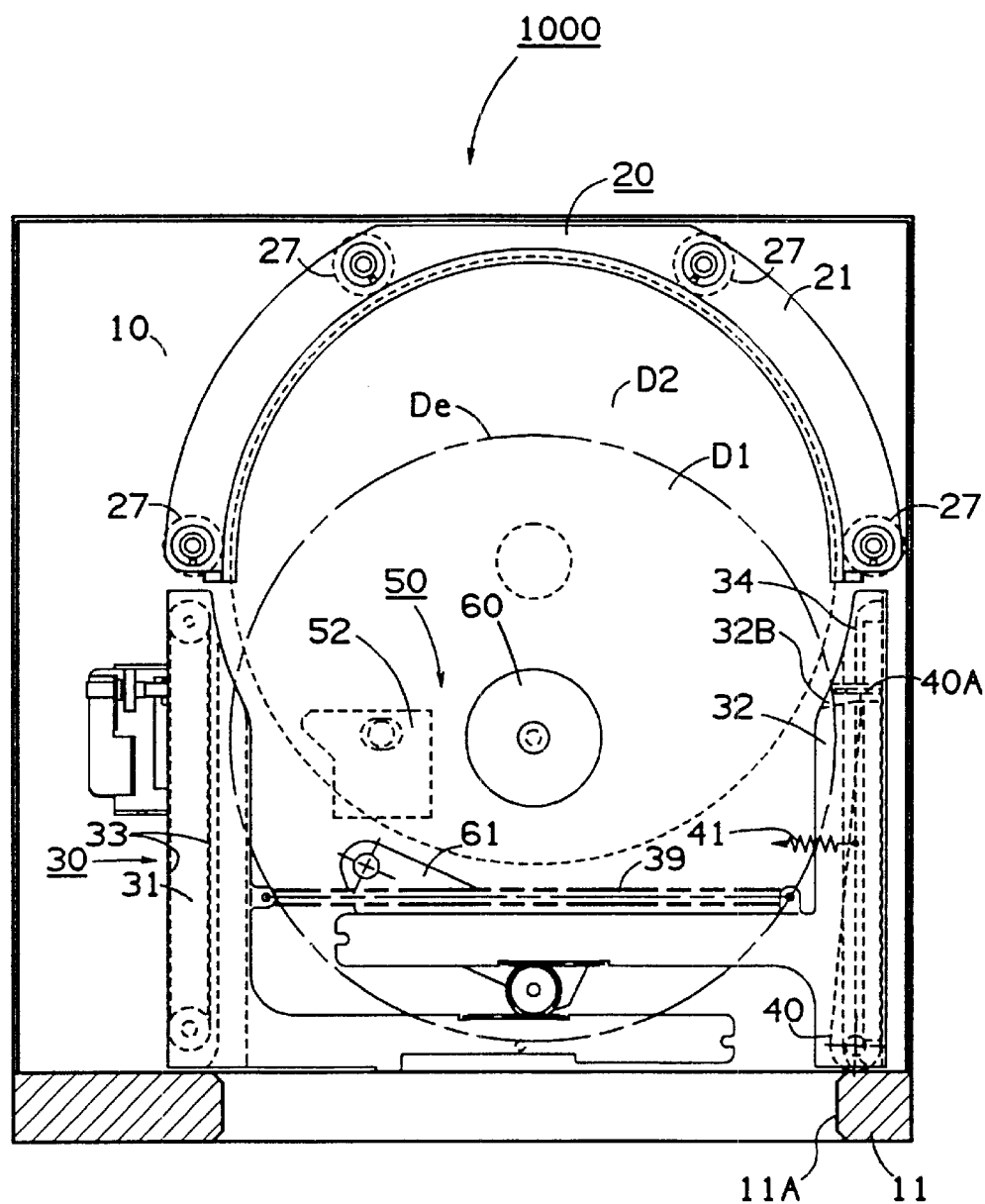
FIG. 4 is a top-view drawing for the purpose of describing the operations of disk playback device 1000.
Figure 7:
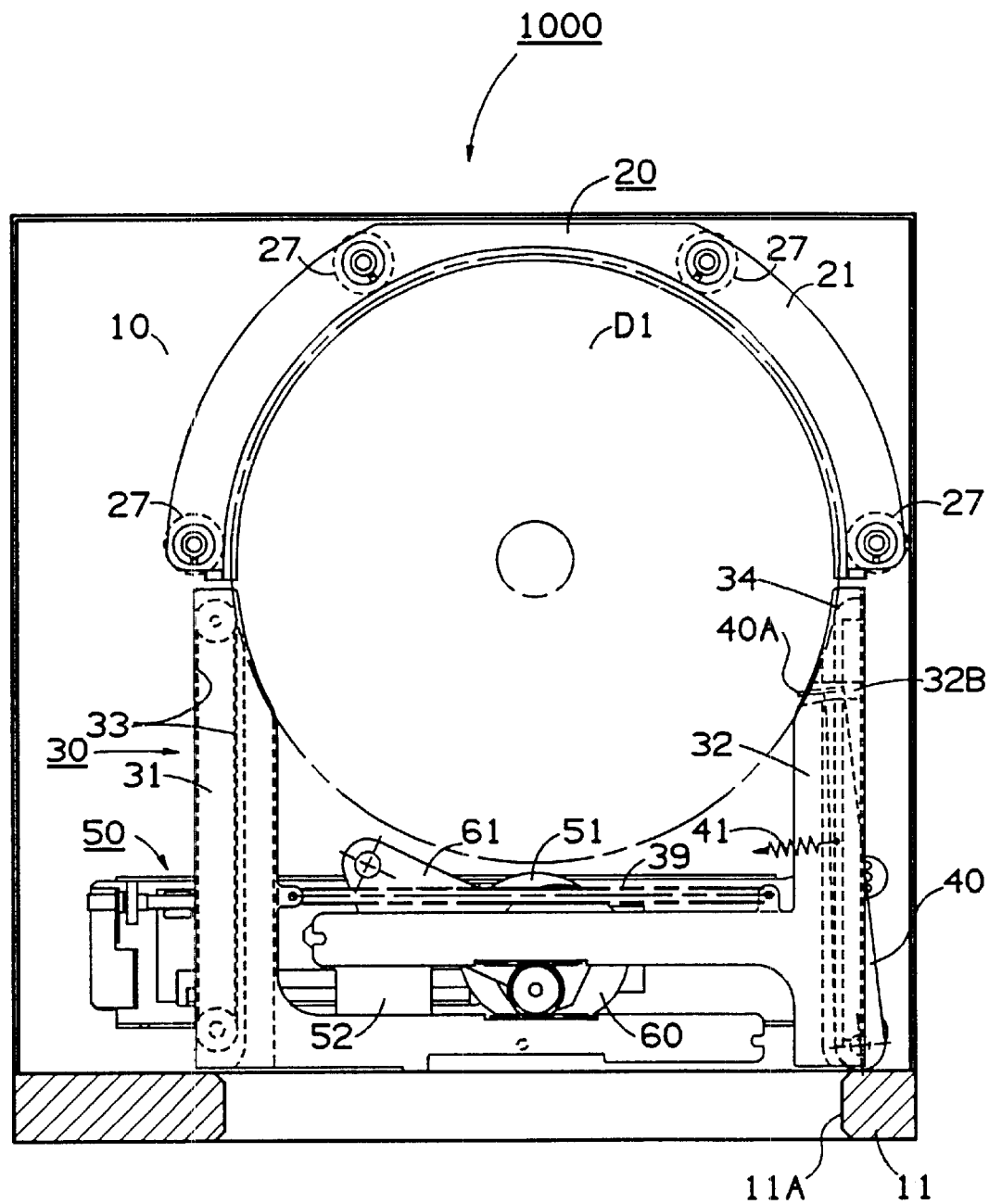
FIG. 7 is a top-view drawing for the purpose of describing the operations of disk playback device 1000.
Figure 8:
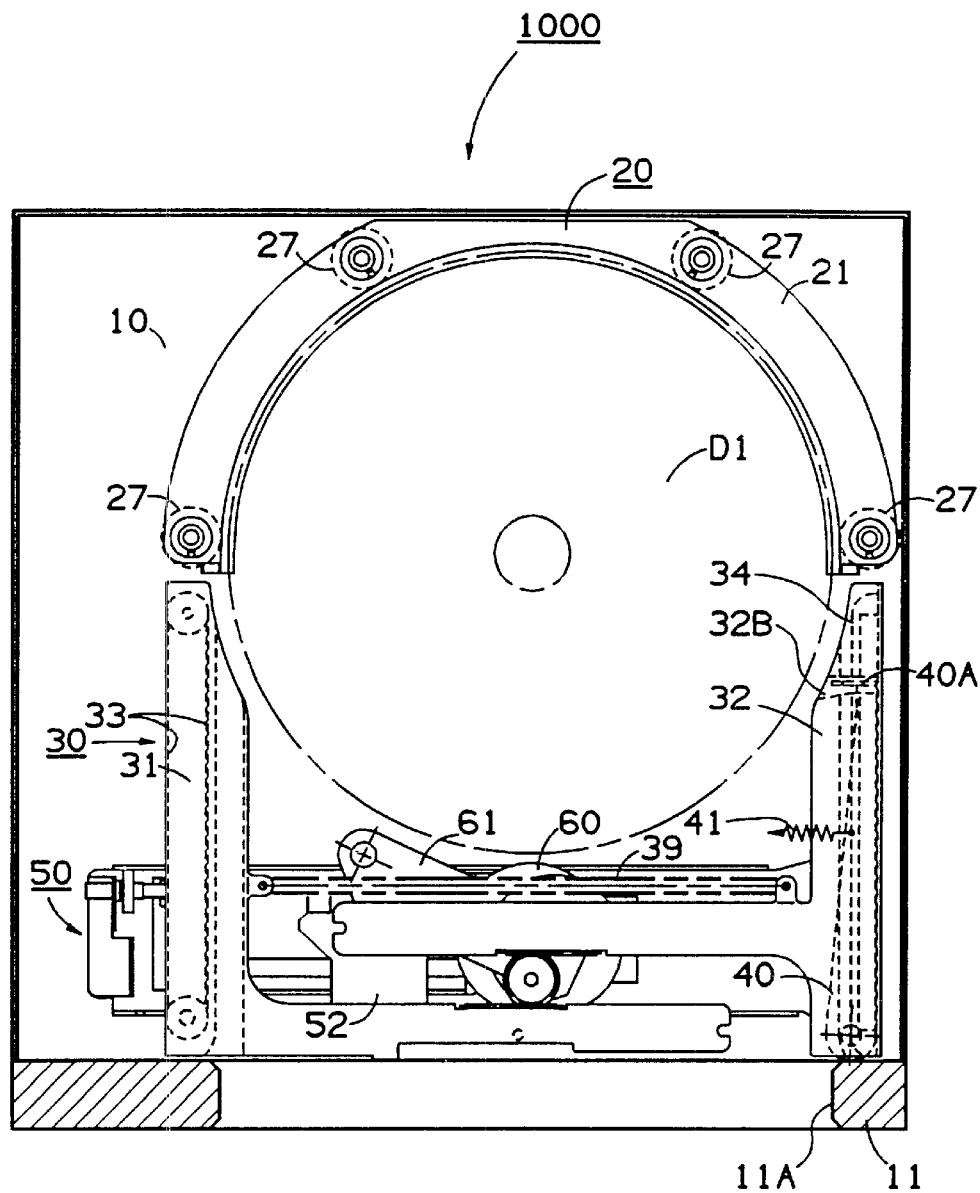
FIG. 8 is a top-view drawing for the purpose of describing the operations of disk playback device 1000.

Referring to FIGS. 1–8, pivoting arm 40 is pulled counter-clockwise by a spring 41 and is positioned so that it engages with a stopper 42. At this state, engagement cavity 40a is brought near the back of slot 11A. Pivoting arm 40 pivots in tandem with the transfer of the inserted disk, keeping the disk level. Pivoting arm 40 is then driven by drive mechanism M3 and is, along with disk transfer mechanism 30 described above, brought to a position away from the edge of the disk (FIG. 4, FIG. 8).

Optical mechanism 50 optically reads the information recorded on a disk which has been brought to the playback position. Optical mechanism 50 includes a turntable 51, on which the disk is mounted. An optical head 52 is attached so that it moves along the radius of the disk, which optically reads recorded information. An optical mechanism chassis 53 supporting turntable 51, and optical head 52 are all also included in optical mechanism 50. Optical mechanism 50 is driven by a drive mechanism M2 so that it moves forward and back between a rear position (FIG. 4) and a front position (FIG. 8). At the rear position, turntable 51 of optical mechanism 50 is co-axial with disk D1, which is at the playback position. At the front position, optical mechanism 50 is recessed away from the stored disks. At the rear position, optical mechanism 50 can move up and down between an up position and a down position. At the up position, the upper surface of turntable 51 is aligned with the bottom surface of disk D1, which is at the playback position. At the down position, optical mechanism 50 is recessed away from disk D1.

Referring again to FIG. 1, disk D1, when it is at the playback position, is fixed onto turntable 51 via a magnet clamper 60. A magnetic plate (not shown in the drawing) is attached to the bottom surface of clamper 60. The attractive force from a magnet 51A, which is attached to the center of turntable 51, fixes disk D1 to turntable 51. Clamper 60 is removably supported by clamper arm 61, which is pivotably supported on chassis 10. Clamper 60 is driven by drive mechanism M3 so that it pivots between a clamped position (FIG. 3) and an unclamped position (FIG. 1). At the clamped position, clamper 60 is co-axial with turntable 51, which has been brought to the rear position. At the unclamped position (FIG. 1), clamper 60 is moved toward the front of the device to a position where it does not overlap with the stocked disks in the device and so disk selection is possible.

Referring to FIG. 3, a Y-shaped groove 61A is formed at the end of clamper arm 61. A shaft 60A having a T-shaped cross-section projects up from clamper 60 and is removably supported by Y-shaped groove 61A, thus keeping shaft 60A level. A lock plate 62 provides self-locking of shaft 60A when it is inserted into Y-shaped groove 61A. Lock plate 62 is supported by clamper arm 61 so that it can pivot around a shaft 61B. Spring 64 pulls lock plate 62 clockwise with a relatively weak force. Engagement with a stopper pin 63 limits clockwise pivoting of lock plate 62.

If clamper arm 61 is rotated clockwise while disk D1 is fixed to turntable 51, lock plate 62 rotates counter-clockwise due to its engagement with shaft 60A. This causes lock plate 62 to be forcibly released because the attractive force between magnet 51A and clamper 60 is greater than a locking force of lock plate 62. On the other hand, if clamper arm 61 pivots in the counter-clockwise direction from the clamp position, lock plate 62 first pivots in the counter-clockwise direction due to its engagement with axis 60A, but afterwards pivots in the clockwise direction and locks shaft 60A within groove 61A.

The following is a description of the operations of disk playback device 1000 described above. Referring to FIG. 1–FIG. 4, the operations involved in playing back a disk inserted through slot 11A will first be described.

At a standby state (FIG. 1), in which a disk can be inserted through slot 11A, spring 39 causes driven and fixed disk guides 31, 32 to be positioned at an initial position, where the distance between belt 33 and friction sheet 34 is smaller than the diameter of the disk. Spring 41 causes pivoting arm 40 to be positioned so that engagement cavity 40A is disposed behind slot 11A. Clamper arm 61 is positioned at an unclamped position, where it does not overlap with a stocked disk D2. Optical mechanism 50 is at the rear position and the down position. Referring momentarily to FIG. 10, stocker 20 is disposed so that first disk holder 21 is aligned with the disk transfer height.

Referring also to FIG. 13, from this standby state, when disk D1 is inserted into slot 11A, the inserted front end of disk D1 is immediately guided into C-shaped groove 40C by sloped surface 40B. The engagement of slot 11A and engagement cavity 40A causes any upward or downward tilting in the insertion orientation of disk D1 to be corrected, and the inserted front end of the disk is prevented from engaging with the mechanisms within the device. As the disk is inserted, pivoting arm 40 pivots clockwise in opposition to the pull from spring 41, thereby maintaining disk D1 level. As the disk is inserted further, driven and fixed disk guides 31, 32 are spread apart in opposition to the pulling of spring 39. When pivoting arm 40 has pivoted to a prescribed angle, drive mechanism M1 begins driving belt 33 so that it rotates counter-clockwise. Since switching mechanism S1 is positioned to the rear of optical mechanism 50, the drive force of drive mechanism M1 is transferred to pulley 35. Belt 33 drives the left outer edge of disk D1, and disk D1 is transferred along friction sheet 34 toward the rear of the device while it is rotated clockwise. When disk D1 is being transferred toward the playback position, engagement cavity 40A of guide arm 40 goes through slit 32B of fixed disk guide 32, thus preventing engagement with fixed disk guide 32.

The angle of pivoting arm 40 is detected to determine when disk D1 has been brought to the playback position (FIG. 2). Belt 33 then stops rotating, and drive mechanism M3 causes clamper arm 61 to pivot counter-clockwise to the clamped position (FIG. 3). Then, drive mechanism M2 brings optical mechanism 50 to the up position so that disk D1 is interposed between turntable 51 and clamper 60. Then, drive mechanism M3 pivots clamper arm 61 clockwise, and driven and fixed disk guides 31, 32 and pivoting arm 40 are moved away from disk edge De (FIG. 4). When clamper arm 61 pivots clockwise, the locked state of lock plate 62 is forcibly disabled because of the engagement with shaft 60A due to the stronger attraction between the magnet of clamper 60 and magnet 51A of turntable 51.

With the operations described above, disk D1 inserted from slot 11a is mounted on optical mechanism 50. A turntable drive motor (not shown in the drawing) rotates disk D1 at a prescribed linear velocity, and optical head 52 optically reads the recorded information. When disk D1 mounted on turntable 51 is to be ejected from slot 11A, the operations described above are performed in reverse. Thus, the detailed descriptions will be omitted here.

Referring to FIGS. 1–8, the following is a description of how disk D1 inserted from slot 11A is stored in first disk holder 21.

Figure 5:
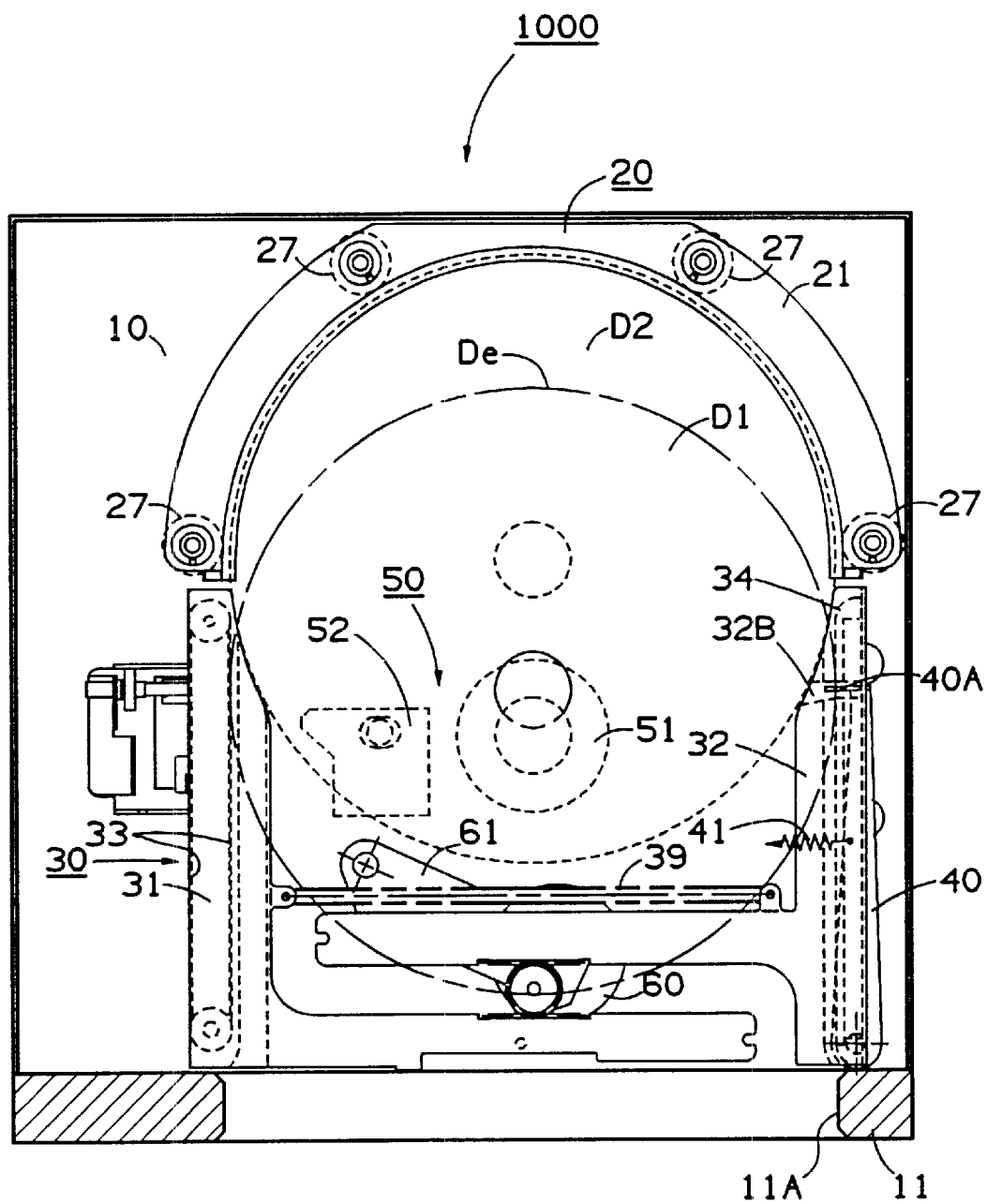
FIG. 5 is a top-view drawing for the purpose of describing the operations of disk playback device 1000.

As described above, when disk D1 is inserted through slot 11A, the inserted end of disk D1 is inserted into engagement cavity 40A of pivoting arm 40 to provide correction of insertion orientation. As the disk is inserted and pivoting arm 40 pivots to a prescribed angle, drive mechanism M1 begins applying counter-clockwise rotation to belt 33, and disk D1 is transferred toward the rear of the device while it is being rotated clockwise. As the disk is being transferred, pivoting arm 40 pivots clockwise, and is pivoted furthest clockwise at a midway position of disk D1 past the playback position (FIG. 5). Thereafter, as the disk is transferred, pivoting arm 40 engages with the edge of the disk toward the front of the device and pivots counterclockwise. At the midway position, the outer right edge of pivoting arm 40 traverses into slit 32B of friction sheet 34, but the narrow width of slit 32B prevents any obstruction to the transfer of the disk. When disk D1 is transferred further and pivoting arm 40 returns counter-clockwise to a prescribed angle, disk D1 is assumed to have been transferred to a holding position, and the rotation of belt 33 is halted (FIG. 6).

Next, drive mechanism M2 moves optical mechanism 50 to a front position where the vertical movement of stocker 20 is not obstructed (FIG. 7). Drive mechanism M3 moves driven and fixed disk guides 31, 32 and pivoting arm 40 away from disk edge De (FIG. 8).

With the operations described above, disk D1 inserted through slot 11A is stored in first disk holder 21 of stocker 20, and disk playback device 1000 is put in a stopped state where stocker 20 can be moved up and down. Of course, the operations described above are performed in reverse to eject disk D1 from slot 11A.

The following is a description of the operations involved between the stopped state and the playback of disk D2 stored in second disk holder 22.

First, drive mechanism M1 drive four stocker screws 27 so that they all rotate clockwise simultaneously, thus moving second disk holder 22 to the transfer height (FIG. 11). Then, drive mechanism M3 positions driven and fixed disk guides 31, 32 so that the disk is interposed between them (FIG. 7). Also, pivoting arm 40 is pivoted counter-clockwise and engages with disk edge De. Then, drive mechanism M4 moves optical mechanism 50 to the rear position (FIG. 6).

The transfer of optical mechanism 50 to the rear position causes switching mechanism S1 to switch to pulley 35, and drive mechanism M1 begins rotating belt 33 clockwise. While rotating counter-clockwise, disk D2 is transferred toward the front of the device. As the disk is being transferred, pivoting arm 40 is pivoted clockwise. When the disk passes the midway position (FIG. 5), pivoting arm 40 begins pivoting counter-clockwise since it engages with the edge of the disk toward the rear of the device. Then, when pivoting arm 40 rotates counter-clockwise to a prescribed angle, disk D2 is assumed to have been brought to the playback position, and the rotation of belt 33 is halted (FIG. 2).

When disk D2 has been brought to the playback position, drive mechanism M3 drives clamper arm 61 counter-clockwise, bringing it to the clamped position (FIG. 3). Then, drive mechanism M2 brings optical mechanism 50 to the up position, and disk D1 is engaged between turntable 51 and clamper 60. Drive mechanism M3 again drives clamper arm 61 clockwise, moving it away from clamper 60, and also moves driven and fixed disk guides 31, 32 and pivoting arm 40 away from disk edge De (FIG. 4). With the operations described above, disk D2 held in disk holder 22 is mounted on optical mechanism 50 and is then rotated at a prescribed linear velocity, and optical head 52 optically reads the recorded information.

The above description covered typical operations performed by the device of this embodiment. Other operations, such as operations performed from the standby state to play back a disk stored in stocker 20 and operations performed to swap a disk at the playback position with another disk in stocker 20, can be understood from the operations described above, and so detailed descriptions will be omitted.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

For example, according to the above embodiment, the disk was supported and transferred using driven and fixed disk guides 31, 32 which extend in the direction of transfer, but the present invention can be applied for a disk transferring mechanism which supports and transfers the disk with 2 loading rollers. This is shown in Japanese Examined Patent No. 4-62146, the disclosure of which is hereby incorporated by reference. In the preferred embodiment, the supporting member is a pivoting arm 40, but it is not limited to a pivoting support.

Figure 15:
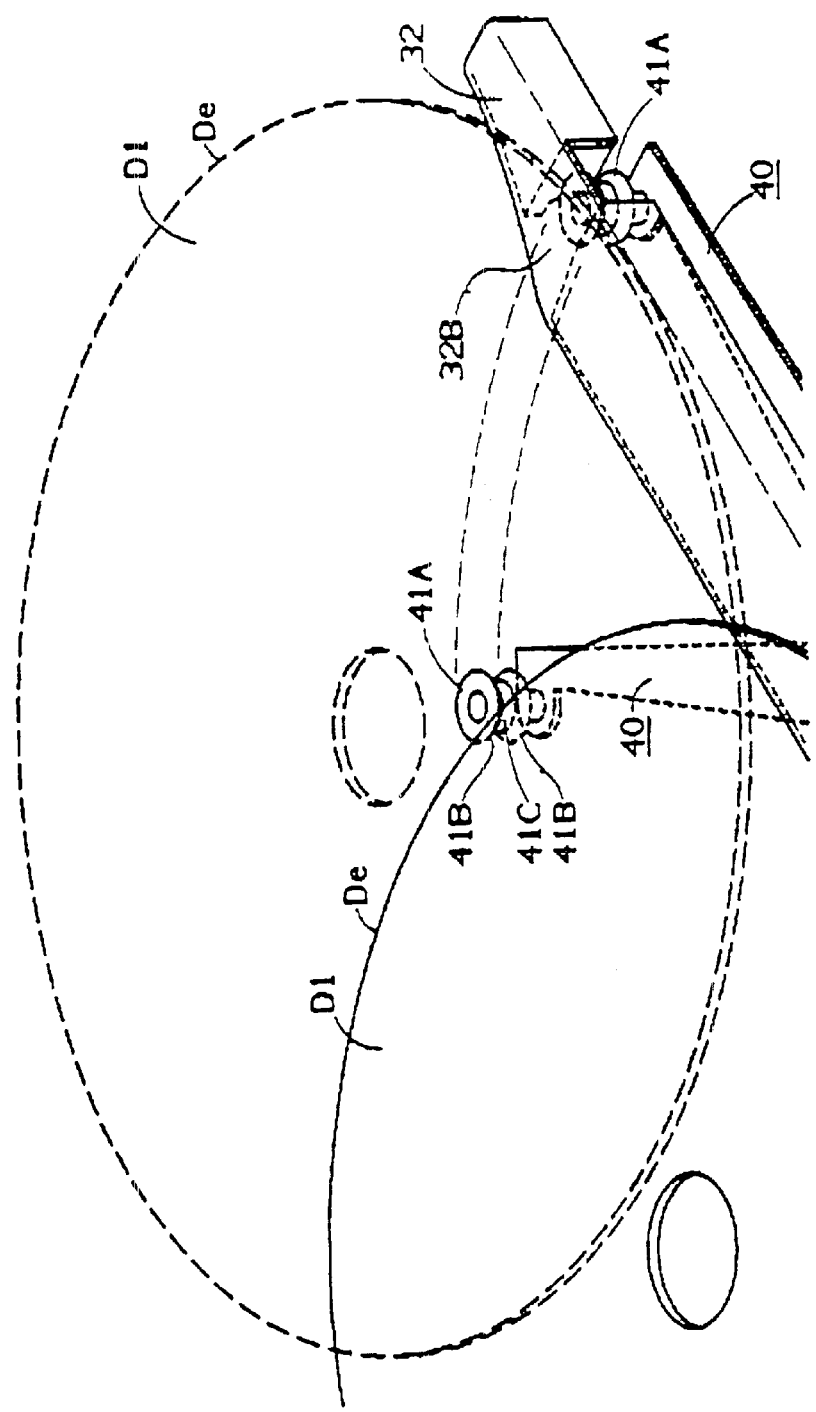
FIG. 15 is a schematic perspective drawing showing another embodiment of the alignment mechanism of the present invention.

Furthermore, engagement cavity 40A is not limited to sloped surface 40B and C-shaped groove 40C. For example, it can have only sloping surface 40B which engages only with the corner of the disk outer surface. Engagement cavity 40A can be formed from a resin with a low friction coefficient, and the friction with disk edge De can be reduced. Referring to FIG. 15, engagement cavity 40A be also replaced by a pulley 41A attached to the end of pivoting arm 40 in a freely rotatable manner. Pulley 41A has two circular members 41B disposed on opposing sides of pulley 41A defining a recessed portion 41C therebetween. Recessed portion 41C engages with disk edge De and provides horizontal support.

By the present invention, pitching vibration of a disk at the time of transfer can be prevented. The occurrence of clamp miss can be dramatically reduced. Furthermore, a disk which is inserted into a slot can be made level right away. Contact of the insertion edge of the disk with mechanisms inside the device such as the clamper is prevented. Furthermore, the engagement cavity engages only with the disk edge. There is no damage done to the disk recording surface.

What is claimed is:

1. A disk transfer device having a means for maintaining alignment of a disk when inserted therein, said disk having at least a first edge, a second edge, and a third edge, thereby defining a primary inserted portion and a secondary inserted portion, said primary inserted portion being a leading part of said disk inserted into said disk transfer device, said third edge being along said primary inserted portion, comprising:

a first guide member having a first surface for contacting said first edge of said disk;

a second guide member having a second surface for contacting said second edge of said disk;

said first and second guides extending longitudinally through a disk transfer plane;

one of said first and second guides being a driven disk guide, a other of said first and second guides being a fixed guide;

said driven disk guide having a means for moving said disk along said fixed disk guide;

a support member for engaging with said third edge of said disk; and said support member keeping contact with said third edge immediately upon insertion of said disk and during a first movement of said disk through said disk transfer plane within said disk transfer device thereby maintaining said alignment of said disk.

2. A disk transfer device as in claim 1 wherein said support member is pivotally mounted upon said disk transfer device.

3. A disk transfer device as in claim 1, wherein at least one of said first guide member and said second guide member includes a slit for integrally receiving said support member thereby allowing said support member to assume a recessed position with respect to said third edge.

4. A disk transfer device as in claim 1 wherein said support member includes an engagement cavity for engaging with said third edge.

5. A disk transfer device as in claim 4 wherein said engagement cavity has a depth which prevents said engagement cavity from engaging a recorded area of said disk.

6. A disk transfer device as in claim 1 wherein said support member includes at least one sloped surface for facilitating engagement with said third edge.

7. A disk transfer device as in claim 1 wherein said support member includes a C-shaped groove for engaging with said third edge.

8. A disk transfer device as in claim 1 wherein said support member includes a pulley shaped member comprising at least two circular portions disposed on opposing ends of said pulley shaped member defining a space therebetween.

9. A disk transfer device as in claim 1 further comprising:

a spring connected to said support member;

said spring biasing said support member toward a front of said disk transfer device; and a stopper disposed on said front of said disk transfer device;

said stopper limiting a second movement of said support member.

10. A disk transfer guide as in claim 1 wherein:

said means for moving includes an endless belt, a first support, and a second support;

said first and second supports are effective to support said endless belt so that said endless belt can rotate about axes of said first and second supports; and said fixed guide includes a slit for receiving said support member thereby allowing said support member to assume a recessed position with respect to said edge.

11. A disk transfer device having a means for maintaining alignment of an inserted disk comprising:

at least a driven longitudinal disk guide and a fixed longitudinal disk guide for guiding said disk;

a first surface on said driven longitudinal disk guide for engaging an edge of said disk;

a second surface on said fixed longitudinal disk guide for engaging said edge;

said driven longitudinal disk guide having a means for moving said disk along said fixed longitudinal disk guide when said edge is engaged;

a support member for engaging with an edge of said disk;

said support member keeping contact with said edge immediately upon insertion of said disk and during a first movement of said disk within said disk transfer device thereby maintaining said alignment of said disk;

at least one of said driven and fixed longitudinal disk guide members including a slit for integrally receiving said support member thereby allowing said support member to assume a recessed position with respect to said edge;

a spring connected to said support member;

said spring biasing said support member toward a front of said disk transfer device; and a stopper disposed on said front of said disk transfer device;

said stopper limiting a second movement of said support member.

12. A disk transfer device as in claim 11 wherein said support member further comprises:

an engagement cavity having a depth which prevents engagement of said engagement cavity with a recorded area of said disk;

a sloped surface leading toward said engagement cavity;

a C-shaped groove disposed within said engagement cavity; and said support member is pivotally mounted upon said disk transfer device.

13. A disk transfer device as in claim 11 wherein said support member includes a pulley shaped member comprising at least two circular portions disposed on opposing ends of said pulley shaped member defining a space therebetween.

14. A disk transfer device having a means for maintaining alignment of an inserted disk comprising:

a first rotatable support;

a second rotatable support;

a belt having a first surface for contacting an edge of said disk;

a longitudinal belt disk guide including said belt reeved over said first rotatable support and said second rotatable support;

a fixed longitudinal disk guide having a second surface for contacting said edge;

said longitudinal belt disk guide and said fixed longitudinal disk guide extend in a direction from a front of said disk transfer device to a back of said disk transfer device;

means for driving at least one of said first rotatable support and said second rotatable support thereby transporting said first surface in said direction such that said disk is transported in said direction when in contact with said first surface and said second surface;

a support member;

said support member having a pivot end;

said pivot end is rotatably mounted towards said front of said disk transfer device;

a spring connected to said support member;

said spring biasing said support member toward said front of said disk transfer device such that said edge contacts said support member when said disk is at an insertion position; and at least one of said longitudinal belt disk guide and said fixed longitudinal disk guide includes a slit for integrally receiving said support member when said disk is located in a recessed position such that said support member maintains contact with said edge during movement of said disk from said insertion position to said recessed position thereby maintaining said alignment of said disk.

15. A disk transfer device as in claim 14 further comprising:

a stopper disposed on said front of said disk transfer device;

said stopper limiting said spring biasing from moving said support member beyond said front of said disk transfer device.

16. A disk transfer device as in claim 15 wherein said support member includes:

a pivot arm;

said pivot arm having an opposite end to said pivot end; and an engagement cavity for engaging said edge;

said engagement cavity being located on said opposite end of said pivot arm.

17. A disk transfer device as in claim 16 wherein said engagement cavity has a depth which prevents said engagement cavity from engaging a recorded area of said disk.

18. A disk transfer device as in claim 15 wherein said support member includes:

a pivot arm;

said pivot arm having an opposite end to said pivot end; and at least one sloped surface for facilitating engagement with said edge;

said at least one sloped surface being located on said opposite end of said pivot arm.

19. A disk transfer device as in claim 15 wherein said support member includes:

a pivot arm;

said pivot arm having an opposite end to said pivot end; and a C-shaped groove for engaging said edge;

said C-shaped groove being located on said opposite end of said pivot arm.

20. A disk transfer device as in claim 15 wherein said support member includes:

a pivot arm;

said pivot arm having an opposite end to said pivot end;

a pulley shaped member; and at least two circular portions disposed on opposing ends of said pulley shaped member defining a space therebetween;

said pulley shaped member being located on said opposite end of said pivot arm.

21. A disk transfer device as in claim 15 further comprising:

a stopper disposed on said front of said disk transfer device;

said stopper limiting said spring biasing from moving said support member beyond said front of said disk transfer device.

* * * * *